(12) United States Patent
Helou, Jr.

(10) Patent No.: US 8,708,282 B2
(45) Date of Patent: Apr. 29, 2014

(54) METHOD AND SYSTEM FOR LOADING AND UNLOADING CARGO ASSEMBLY ONTO AND FROM AN AIRCRAFT

(75) Inventor: Elie Helou, Jr., Carpenteria, CA (US)

(73) Assignee: Biosphere Aerospace, LLC, Carpinteria, CA (US)

( * ) Notice: Subject to any disclaimer, the term of this patent is extended or adjusted under 35 U.S.C. 154(b) by 267 days.

(21) Appl. No.: 12/846,627

(22) Filed: Jul. 29, 2010

(65) Prior Publication Data

US 2010/0308180 A1 Dec. 9, 2010

Related U.S. Application Data

(60) Continuation-in-part of application No. 12/833,868, filed on Jul. 9, 2010, now Pat. No. 8,608,110, which is a continuation-in-part of application No. 12/636,381, filed on Dec. 11, 2009, now abandoned, which is a division of application No. 11/782,850, filed on Jul. 25, 2007, now Pat. No. 7,699,267, which is a division of application No. 10/996,799, filed on Nov. 23, 2004, now Pat. No. 7,261,257.

(51) Int. Cl.
*B64C 1/22* (2006.01)

(52) U.S. Cl.
USPC ............... 244/137.1; 244/118.2; 244/119

(58) Field of Classification Search
USPC ............ 244/118.2, 118.1, 119, 120, 129.4, 244/129.5, 129.1, 137.3, 137.1
See application file for complete search history.

(56) References Cited

U.S. PATENT DOCUMENTS

| | | | |
|---|---|---|---|
| 2,053,969 A | 9/1936 | Olds | 220/1.5 |
| 2,095,440 A | 10/1937 | Hojnowski | 244/118.1 |
| 2,387,527 A | 10/1945 | Nagamatsu | 244/118 |
| 2,388,380 A | 11/1945 | Bathurst | 224/118.2 |
| 3,388,380 A | 11/1945 | Bathurst | 244/118.2 |
| 2,407,724 A | 9/1946 | Fowler | 244/118 |
| 2,407,774 A | 9/1946 | Fowler | 244/118.2 |
| 2,425,499 A | 8/1947 | Watter | 244/118.3 |
| 2,425,972 A | 8/1947 | Watter | 244/118.3 |
| 2,446,441 A | 8/1948 | Taylor | 244/137 |
| 2,876,969 A | 3/1959 | Tydon et al. | 244/118.3 |
| 2,931,681 A | 4/1960 | Keller | 254/2 R |

(Continued)

OTHER PUBLICATIONS

Sikorsky S-64 Skycrane, https://en.wikipedia.org/wiki/S-64_Skycrane.

(Continued)

*Primary Examiner* — Benjamin P Lee
(74) *Attorney, Agent, or Firm* — Sheppard, Mullin, Richter & Hampton LLP

(57) ABSTRACT

A system for loading and unloading a cargo assembly onto and from an aircraft. The system comprises an aircraft and a movable platform. The aircraft comprises a forward fairing, an aft fairing, a spine disposed between the forward fairing and the aft fairing and a plurality of mounts coupled to the spine and configured to structurally engage the cargo container onto the spine. The aft fairing is movable between a fixed position for flight and an open position for at least loading and unloading of the cargo assembly. The aircraft is configured such that an unobstructed passageway is provided in an area underneath the spine during loading or unloading of the cargo assembly. An aft access is provided when the aft fairing is moved to the open position. The movable platform is used to maneuver the cargo assembly for loading and unloading onto and from the spine, respectively.

18 Claims, 11 Drawing Sheets

(56) References Cited

U.S. PATENT DOCUMENTS

| | | | | |
|---|---|---|---|---|
| 3,009,672 | A | 11/1961 | Tharratt | 244/137.1 |
| 3,028,130 | A | 4/1962 | Burton | 244/137.1 |
| 3,055,620 | A | 9/1962 | Weiland | 244/135 A |
| 3,147,942 | A | 9/1964 | Griffith | 244/118.3 |
| 3,150,849 | A | 9/1964 | Graham et al. | 244/100 R |
| 3,209,929 | A | 10/1965 | Petersen | 414/676 |
| 3,289,981 | A | 12/1966 | Meyer | 244/137.2 |
| 3,368,838 | A | 2/1968 | Reich | 294/82.24 |
| 3,381,921 | A | 5/1968 | McDonough | 410/79 |
| 3,419,164 | A | 12/1968 | O'Neill | 414/345 |
| 3,691,595 | A | 9/1972 | Backteman et al. | 24/287 |
| 3,872,555 | A | 3/1975 | Link et al. | 24/590.1 |
| 3,966,285 | A | 6/1976 | Porch et al. | 312/265.4 |
| 3,972,427 | A | 8/1976 | Stanley et al. | 244/137.1 |
| 4,039,163 | A * | 8/1977 | Shorey | 244/137.1 |
| 4,301,984 | A | 11/1981 | Olason | 244/137.1 |
| 4,379,533 | A | 4/1983 | Caldwell et al. | 244/118.1 |
| 5,238,102 | A | 8/1993 | Langer | 206/3 |
| 5,240,207 | A | 8/1993 | Eiband et al. | 244/190 |
| 5,816,425 | A | 10/1998 | Keip et al. | 220/4.31 |
| 5,975,464 | A | 11/1999 | Rutan | 244/120 |
| 6,070,460 | A | 6/2000 | Leslie et al. | 73/170.07 |
| 6,237,795 | B1 | 5/2001 | Buckley et al. | 220/1.5 |
| 6,308,131 | B1 | 10/2001 | Fox | 701/124 |
| 6,363,586 | B1 | 4/2002 | Neufingerl | 24/287 |
| 6,494,404 | B1 | 12/2002 | Meyer | 244/118.2 |
| 6,554,225 | B1 * | 4/2003 | Anast et al. | 244/117 R |
| 6,557,800 | B2 * | 5/2003 | Medina et al. | 244/118.1 |
| 6,663,047 | B1 * | 12/2003 | Arata | 244/137.1 |
| 6,817,579 | B2 | 11/2004 | Van der Velden et al. | 244/137.2 |
| 7,000,765 | B2 | 2/2006 | Hase et al. | 206/503 |
| 7,003,374 | B2 | 2/2006 | Olin et al. | 700/213 |
| 7,195,200 | B2 | 3/2007 | Yamane | |
| 7,261,257 | B2 | 8/2007 | Helou, Jr. | |
| 7,344,109 | B1 * | 3/2008 | Rezai | 244/118.2 |
| 7,534,082 | B2 * | 5/2009 | Rawdon et al. | 414/347 |
| 7,604,204 | B2 * | 10/2009 | Jacobsen et al. | 244/137.1 |
| 7,699,267 | B2 | 4/2010 | Helou, Jr. | |
| 7,721,988 | B2 | 5/2010 | Schiebel | |
| 7,845,898 | B2 * | 12/2010 | Rawdon et al. | 414/809 |
| 2003/0214143 | A1 | 11/2003 | Walker | 294/81.53 |
| 2004/0135031 | A1 | 7/2004 | Stupakis | 244/13 |
| 2004/0245378 | A1 | 12/2004 | Nonami et al. | |
| 2005/0247824 | A1 | 11/2005 | Allison | 244/137.2 |
| 2006/0022090 | A1 | 2/2006 | McCoskey et al. | 244/137.1 |
| 2006/0038077 | A1 | 2/2006 | Olin et al. | 244/137.1 |
| 2006/0108477 | A1 | 5/2006 | Helou | 244/137.1 |
| 2007/0025832 | A1 * | 2/2007 | Rawdon et al. | 414/401 |
| 2007/0125908 | A1 | 6/2007 | Eichholz et al. | 244/118.1 |
| 2009/0026314 | A1 * | 1/2009 | Helou, Jr. | 244/118.1 |
| 2009/0114773 | A1 | 5/2009 | Helou, Jr. | |
| 2010/0181416 | A1 | 7/2010 | Sakamoto et al. | |
| 2010/0252682 | A1 * | 10/2010 | Pahl | 244/129.5 |
| 2010/0276538 | A1 | 11/2010 | Helou, Jr. | |

OTHER PUBLICATIONS

Sikorsky CH-54 Tarhe, https://en.wikipedia.org/wiki/Sikorsky_CH-54_Tarhe.

XCH-62 Heavy Lift Helicopter [HLH], http://www.globalsecurity.org/military/systems/aircraft/h-62-pics.htm.

Aircraft 73-22012 Photo, http://www.airport-data.com/aircraft/photo/000120633L.html.

Heavy lift helicopter, http://www.google.com/search?q=heavy+lift+helicopter&source=lnms&tbm=isch&sa=X&ei=rjmpUZPOBKOziQKN7ID4Bg&sqi=2&ved=0CAcQ_AUoAA&biw=768&bih=928#biv=i%7C48%3Bd%7CxOuP_ohGASoMM%3A.

Mil Mi-10 Harke, Heavy Lift Russian Helicopter, http://photovalet.com/79088.

Autonomous Landing and Hazard Avoidance Technology LIDAR, ED10-0190-88, http://www.nasa.gov/centers/dryden/multimedia/imagegallery/Misc/ED10-0190-88.html.

Hughes XH-17 "Flying Crane", http://www.diseno-art.com/news_content/2012/12/hughes-xh-17-flying-crane/.

* cited by examiner

METHOD AND SYSTEM FOR LOADING AND UNLOADING CARGO ASSEMBLY ONTO AND FROM AN AIRCRAFT

CROSS-REFERENCE TO RELATED APPLICATIONS

This application is a continuation-in-part of U.S. patent application Ser. No. 12/833,868 filed on Jul. 9, 2010, now pending, which is a continuation-in-part of U.S. patent application Ser. No. 12/636,381 filed on Dec. 11, 2009, now pending, which is a divisional application of U.S. patent application Ser. No. 11/782,850, filed Jul. 25, 2007, now U.S. Pat. No. 7,699,267, which is a divisional application of U.S. patent application Ser. No. 10/996,799, filed Nov. 23, 2004, now U.S. Pat. No. 7,261,257. The disclosures of each of these references are incorporated herein by reference in each of their entireties.

FIELD OF THE INVENTION

The present invention relates to a cargo aircraft system and, more particularly, to a cargo aircraft system that is designed to transport modular cargo units of various configurations and sizes.

BACKGROUND

The basic unit for transporting goods has been the truck. Being the basic unit, the truck has defined limitations on intermodal containers that can typically be transported by ships, trains and trucks. However, airplanes have generally been excluded from participation in transportation of intermodal and many other types of cargo. This is due to the limitations placed by the design and construction of cargo airplanes.

The design and construction of most civilian cargo aircraft are based on that of passenger airplanes. The basic structure is a monocoque-based fuselage which is substantially cylindrical in shape. Monocoque-based structures support the structural load of an aircraft by a unitary structural body, as opposed to heavier internal frames or trusses. The unibody construction of the monocoque-based aircraft generally lack sufficient structure to adequately or efficiently support and distribute concentrated cargo loads across the aircraft fuselage and to the wings.

Additionally, the cylindrically-shaped fuselage imposes additional restrictions on cargo size and dimensions. Thus, cargo having irregular or unusually large dimensions are generally unsuited for air transport via today's cargo aircraft. Moreover, as most cargo units are substantially rectangular in shape, loading such cargo units into a cylindrical fuselage results in a significant amount of wasted dead space.

SUMMARY

The cargo aircraft systems disclosed herein comprise a spine structure onto which a cargo assembly may be mounted. The spine structure replaces the cylindrically-shaped monocoque-based fuselages of today's aircraft and has sufficient structure, in combination with the cargo assembly, to distribute concentrated cargo loads along its length and to the wings. The cargo assembly is an integrated and unitary structure formed from one or a plurality of cargo units coupled together. The cargo unit may be a modular frame unit or a modular container unit and the resulting cargo assembly may be any one or a combination of modular frame and container units. The cargo assembly is structurally integrated with the spine to form part of the aircraft structure such that the aircraft is able to withstand tortional and bending loads experienced during flight. Thus, the cargo assembly augments the structure of the spine, which itself would not be able to sustain the tortional and bending loads of the aircraft when the spine is loaded with the cargo assembly. Moreover, because the cargo aircraft eliminates the need for additional structure to support the load of the cargo assembly, a significant reduction in the weight of the cargo aircraft is realized. This, in turn, results in greater fuel efficiency and decreased cost of operation.

In one embodiment, an aircraft for transporting a cargo assembly is disclosed. The aircraft comprises a forward fairing, an aft fairing and a spine disposed between the forward fairing and the aft fairing. The aft fairing is movable between a fixed position for flight and an open position for at least loading and unloading of the cargo assembly. The aircraft is configured such that an unobstructed passageway is provided between the ground surface and the spine during loading or unloading of the cargo assembly onto or from the spine, respectively. An aft access to the unobstructed passageway and the spine is provided when the aft fairing is moved to the open position.

In accordance with a first aspect, the aft fairing is removed from the aircraft to provide the aft access to the unobstructed passageway and the spine when the aft fairing is in the open position.

In accordance with a second aspect, the aft fairing is pivotally moved to provide the aft access to the unobstructed passageway and the spine when the aft fairing is in the open position.

In accordance with a third aspect, the aircraft further comprises lower fairing doors pivotally coupled to lateral substructures coupled to the forward fairing and the aft fairing.

In accordance with a fourth aspect, the aircraft further comprises side fairing panels disposed between the forward fairing and the aft fairing.

In accordance with a fifth aspect, the side fairing panels further comprise one or more subpanels, the one or more subpanels being retractable to expose a portion of the cargo assembly. The subpanels may be retracted to expose the portion of the cargo assembly while the aircraft is in flight.

In accordance with a sixth aspect, the aircraft further comprises a plurality of mounts coupled to the spine, the plurality of mounts configured to structurally engage the cargo assembly onto the spine. The plurality of mounts may be actuated between an engage and a release position, wherein in the engage position, the mounts structurally engage the cargo assembly to the spine and wherein in the release position, the mounts disengage and release the cargo assembly from the spine. The plurality of mounts may be actuated in a release position to disengage and release the cargo assembly from the spine while the aircraft is in flight.

In accordance with a seventh aspect, the aft fairing comprises two halves pivotally coupled to corresponding sides of the aircraft. The two halves of the aft fairing are pivotally actuated in the open position to increase drag during landing of the aircraft.

In accordance with an eighth aspect, the aircraft further comprises wings coupled to the spine. The aircraft may further comprise landing gear and supports coupling the landing gear to either one or both of the spine or the wings.

In another embodiment, a system for loading and unloading a cargo assembly onto an aircraft is disclosed. The system comprises an aircraft and a movable platform. The aircraft comprises a forward fairing, an aft fairing and a spine disposed between the forward fairing and the aft fairing. A plurality of mounts are configured to structurally engage the cargo container onto the spine. The aircraft is configured such that an unobstructed passageway underneath the spine is provided during loading or unloading of the cargo assembly onto or from the spine. The movable platform is configured for maneuvering the cargo assembly to and from the spine.

In accordance with a first aspect the aft fairing is movable between a fixed position for flight and an open position and wherein an aft access to the unobstructed passageway and the spine is provided when the aft fairing is in the open position.

In accordance with a second aspect, the movable platform maneuvers the cargo assembly to and from the spine via the aft access and the unobstructed passageway.

In accordance with a third aspect, the movable platform further comprises sensors for determining a location of the movable platform relative to the spine. The movable platform may be configured to lift the cargo assembly onto the spine. The aircraft spine and the movable platform may each comprise means for determining a loading position of the movable platform relative to the spine prior to lifting the cargo assembly onto the spine for mounting thereon.

Other objects, features and advantages of the present invention will become apparent to those skilled in the art from the following detailed description.

BRIEF DESCRIPTION OF THE DRAWINGS

Illustrative embodiments of the present invention are described herein with reference to the accompanying drawings, in which.

Like numerals refer to like parts throughout the several views of the drawings.

DETAILED DESCRIPTION OF THE PREFERRED EMBODIMENTS

Figure 1:
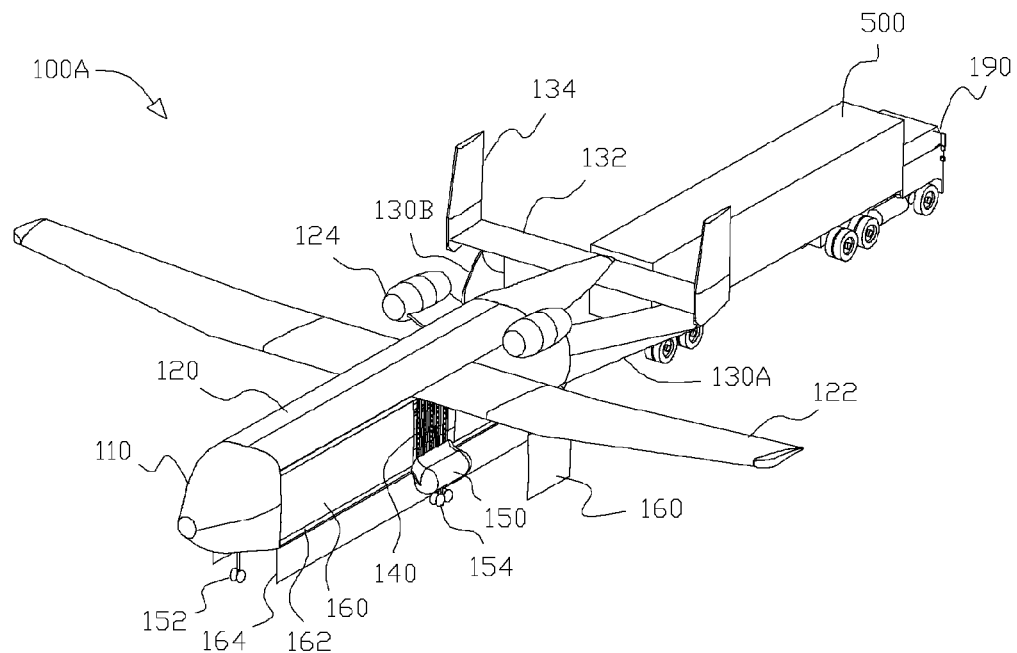
FIG. 1 is a perspective view of an embodiment of the cargo aircraft system showing the aft loading of the cargo assembly onto an upper spine aircraft.

FIG. 1 illustrates an embodiment of a cargo aircraft system. The cargo aircraft system is depicted as comprising an aircraft 100A and a cargo transporter 190, such as a truck or a movable platform, comprising a cargo assembly 500. Embodiments of the basic structure of a cargo aircraft are also described in U.S. Pat. No. 7,261,257, issued Aug. 28, 2007, and U.S. patent application Ser. No. 12/833,868 filed on Jul. 9, 2010, the entire contents of which are incorporated herein by reference.

Generally, the cargo aircraft 100A comprises a forward fairing 110, an aft fairing 130A, 130B, and an empennage having laterally extending horizontal stabilizers 132 and twin vertical stabilizers 134. An upper spine 120 is provided between the forward fairing 110 and aft fairing 130A, 130B. A plurality of mounts (not shown) is disposed at various intervals along the upper spine 120 to structurally engage the cargo assembly 500 at various attachment points. A depiction of the mounts and the manner in which the cargo assembly is coupled onto the upper spine via the mounts, is further described in U.S. Pat. No. 7,261,257 and co-pending U.S. patent application Ser. No. 12/833,868.

The upper spine 120 is understood as comprising one or more layers of interconnected spars and bulkheads/ribs to which mounts are attached, as described in co-pending U.S. patent application Ser. No. 12/833,868. It is understood that the number of layers of interconnected spars and bulkheads/ribs may be provided as required by specific weight regimes. The upper spine 120 is designed to be as light as possible. As such, the spine structure is capable of supporting takeoff loads, flight loads and landing loads of the aircraft when free of cargo. However, when the cargo assembly 500 is mounted onto the spine, the spine, by itself, is not required to fully sustain bending and tortional loads in flight, and landing and takeoff loads. The additional rigidity required is supplied by the cargo assembly 500. The cargo assembly 500 augments the spine and aircraft structure so as to support these loads when it is structurally integrated to the spine. To this end, the individual units comprising the cargo assembly are constructed with sufficient structure and rigidity and are securely mounted to the spine such that bending and tortional forces experienced by the spine structure are imposed upon the cargo assembly.

The simplicity of the spine structure furthermore permits it to be configured in any variety of widths and weight capacities. Thus, for example, the spine may be configured to support extra large cargo loads which cannot be transported within standard intermodal containers by simply increasing the width and the number of layers of interconnected bulkheads and spars to an extent necessary to accommodate such extra large cargo loads. Thus, the spine permits greater flexibility with respect to the dimensions of the cargo assembly than would be realized by an aircraft with the standard monocoque-based cylindrical fuselage. Moreover, the structural features of the spine allow for the cargo load to be more efficiently distributed along the spine and also to the wings.

Figure 3A:
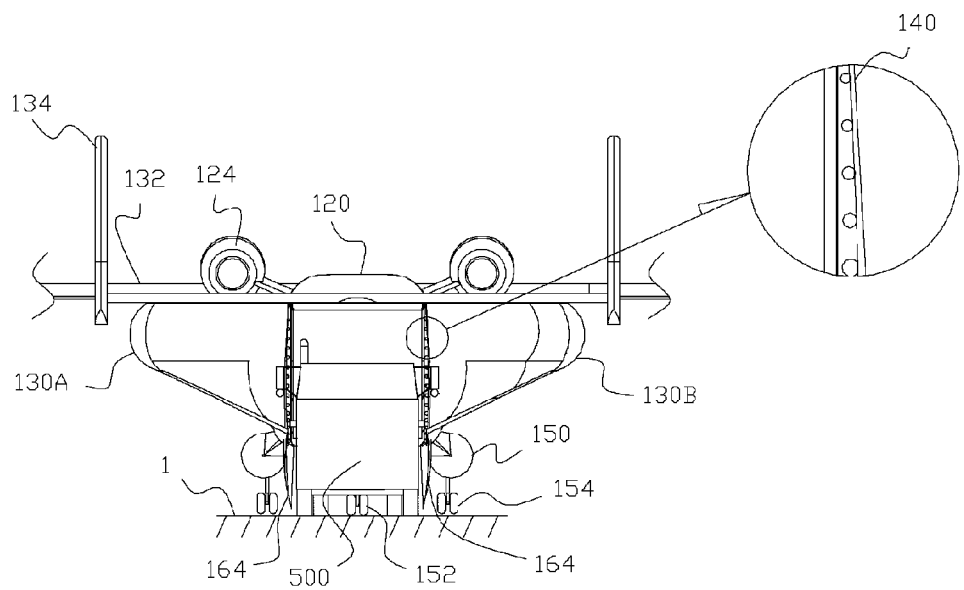
FIGS. 3A and 3B illustrate the loading of the cargo assembly onto the upper spine.
Figure 3B:
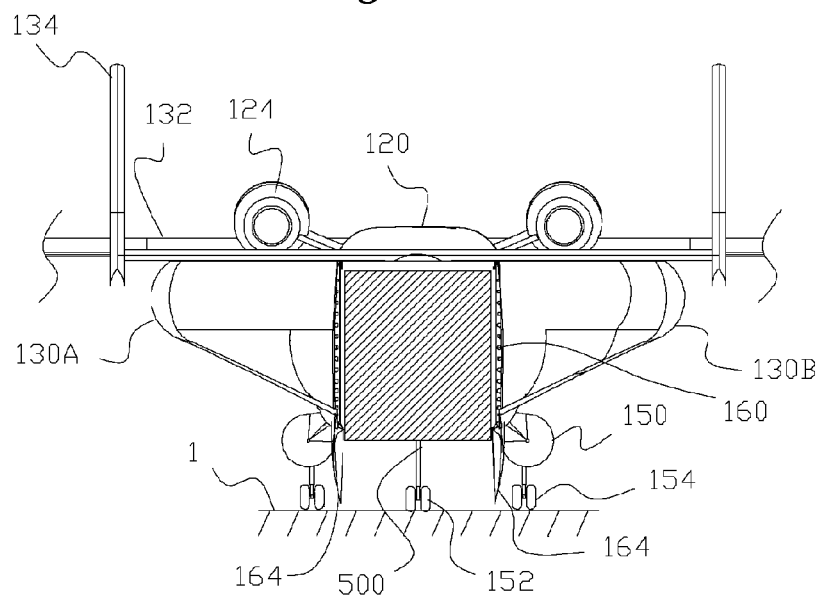

Wings 122 are structurally associated with the upper spine 120. Wings 122 may optionally contain fuel tanks (not shown). Forward landing gear 152 may be provided underneath the forward fairing 110 and lateral landing gears 154 may be provided on both sides of the spine 120. The lateral landing gears 154 extends from respective pods 150 for landing and take-off and retracts into the pods 150 during flight. Supports 140 may couple the pods 150 to the spine 120 as shown in FIGS. 1 and 3A-B or, alternatively, to the wings 122 (not shown). The supports 140 must be constructed of sufficient structure, as they experience compression load from the lateral landing gear 154 during landing and take-off. As such, they may be constructed in a manner similar to the spine described above, based on the anticipated load of the aircraft and the cargo assembly. Engines 124 are shown in the embodiment of FIG. 1 to be laterally mounted to the spine 120. It is understood that the engines 124 may also be mounted to the wings 122.

Side fairings 160 may be provided on both sides of the aircraft to reduce the drag of the aircraft in flight. Lower fairing doors 164 may also be pivotally coupled to the sub-structure 162 extending between the forward fairing 110 and the aft fairing 130A, B. The sub-structure 162 may be further supported along its length via straps extending vertically from the spine 120. The lower fairing doors 164 are pivotally opened during loading and unloading of the cargo assembly 500 onto and from the aircraft 100A. The side fairings 160 and the lower fairing doors 164 are preferably made of a composite light weight material and the primary function of the aerodynamic fairings is to reduce drag. In a particularly preferred embodiment, the side fairings 160 and the lower fairing doors 164 are of a light weight structure and do not provide substantial, if any, support or rigidity to the aircraft in flight.

Figure 2:
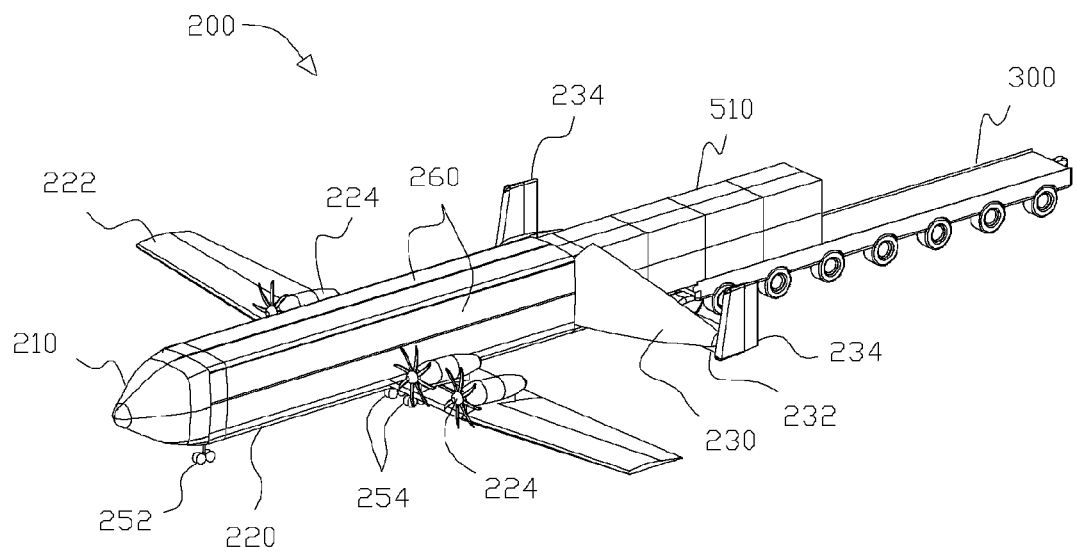
FIG. 2 is a perspective view of another embodiment of the cargo aircraft system showing the aft loading of the cargo assembly onto a lower spine aircraft.
Figure 11A:
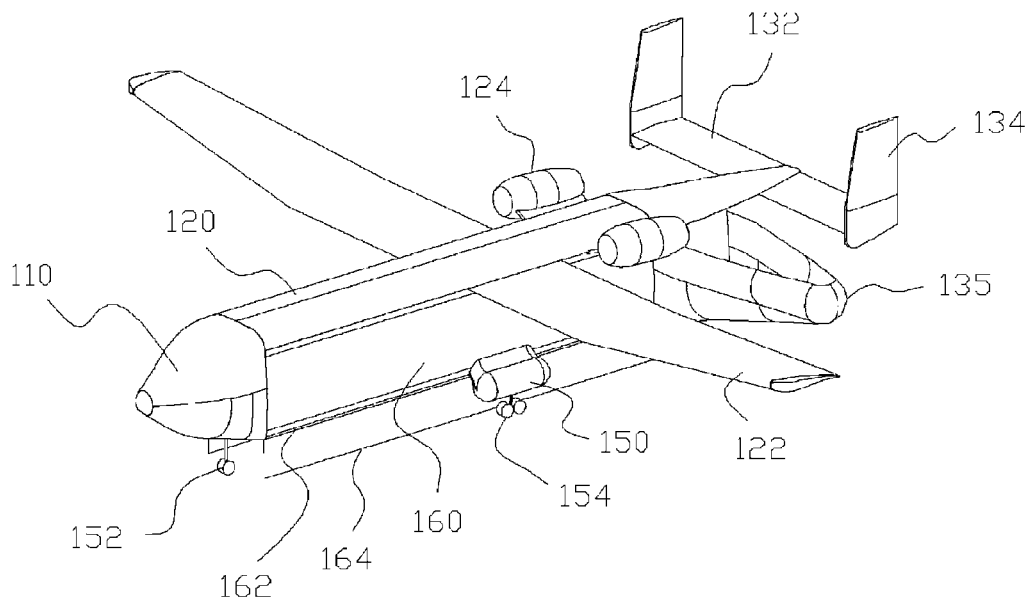
FIGS. 11A and 11B show different embodiments of providing an aft access to the aircraft spine.
Figure 11B:
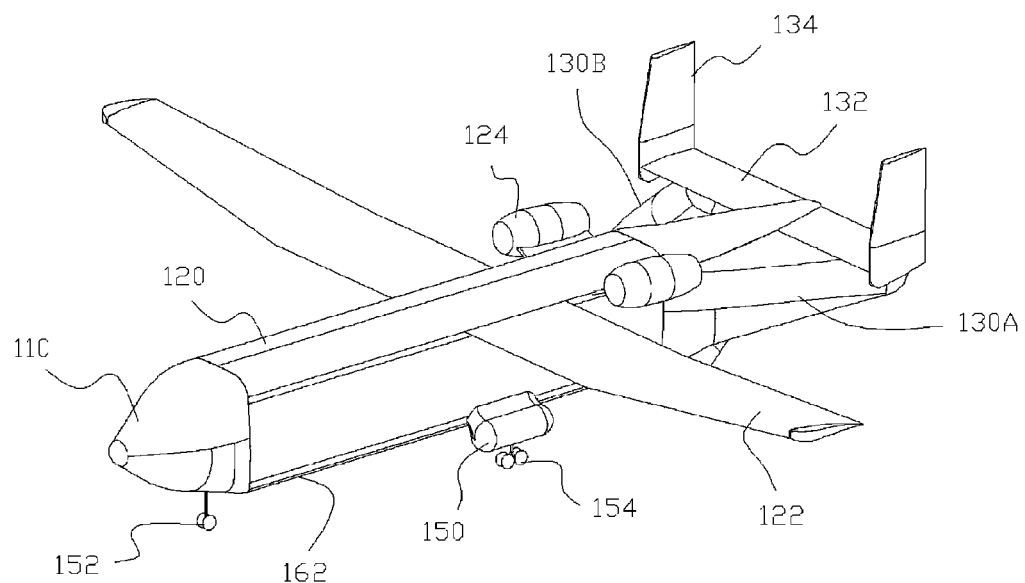

The aft fairing in FIGS. 1, 3A, 3B, and 11B is depicted as having two halves 130A, 130B, which are each pivotally coupled to corresponding sides of the aircraft. Alternatively, as depicted in FIGS. 2 and 11A, the entire aft fairing 135 may be provided as a single integral unit that is pivotally coupled to one side of the aircraft. One advantage of having the aft fairings in two halves 130A, 130B is that the two halves may be pivotally actuated in the open position during loading and unloading of the cargo assembly and also during landing operations to increase drag and the reduce landing roll out.

FIG. 2 illustrates another embodiment of the cargo aircraft system. The cargo aircraft system is depicted as comprising an aircraft 200 and a movable platform 300 comprising a cargo assembly 510. The cargo aircraft 200 comprises a forward fairing 210, an aft fairing 230, and an empennage having laterally extending horizontal stabilizers 232 and twin vertical stabilizers 234. Unlike the aircraft depicted in FIG. 1, the cargo aircraft 200 comprises a lower spine 220 between the forward fairing 210 and the aft fairing 230. A plurality of mounts (not shown) is similarly disposed at various intervals along the lower spine 220. The plurality of mounts may further be retracted beneath the surface of the lower spine 220 to facilitate loading of the cargo assembly 510. Once the cargo assembly 510 is loaded onto the lower spine 220, the plurality of mounts may be actuated to structurally engage the cargo assembly 510 at attachment points provided on the cargo assembly 510. A depiction of the mounts and the manner in which the cargo assembly is coupled onto the lower spine via the mounts, is further described in U.S. Pat. No. 7,261,257 and co-pending U.S. patent application Ser. No. 12/833,868.

Wings 222 are structurally associated with the lower spine 220. Wings 222 may optionally contain fuel tanks (not shown). Forward landing gear 252 may be provided underneath the forward fairing 210 and lateral landing gears 254 may be provided underneath the spine 220 or the wings 222. Engines 224 are shown in the embodiment of FIG. 1 to be mounted to the wings 222.

Aerodynamic fairings 260 may be provided to enclose the cargo assembly 510 mounted onto the lower spine 220. Again, the aerodynamic fairings 260 are preferably made of a composite light weight material and the primary function of the aerodynamic fairings is to reduce drag. In a particularly preferred embodiment, the aerodynamic fairings 260 are of a lightweight structure and thus do not provide substantial, if any, support or rigidity to the aircraft in flight. As explained above, the aft fairing 230 is a single integral unit that is pivotally coupled to one side of the aircraft 200.

FIGS. 3A-3B show the loading sequence of the cargo assembly 500 onto the upper spine 120 of the aircraft depicted in FIG. 1. As shown in FIG. 3A, the two halves of the aft fairing 130A, 130B are pivotally coupled to corresponding sides of the aircraft and are opened to permit an aft access to the spine. The aircraft is further configured such that an unobstructed passageway is provided underneath the spine when the lower fairing doors 164 are pivotally opened. Because there are no intervening aircraft structures between the ground surface 1 and the spine 120, a vehicle or a movable platform 300 may be maneuvered from the aft access to a position directly underneath the spine 120. Once the movable platform 300 is in the appropriate position underneath the spine 120, the cargo assembly 500 is vertically elevated toward the spine 120 for mounting.

Figure 4A:
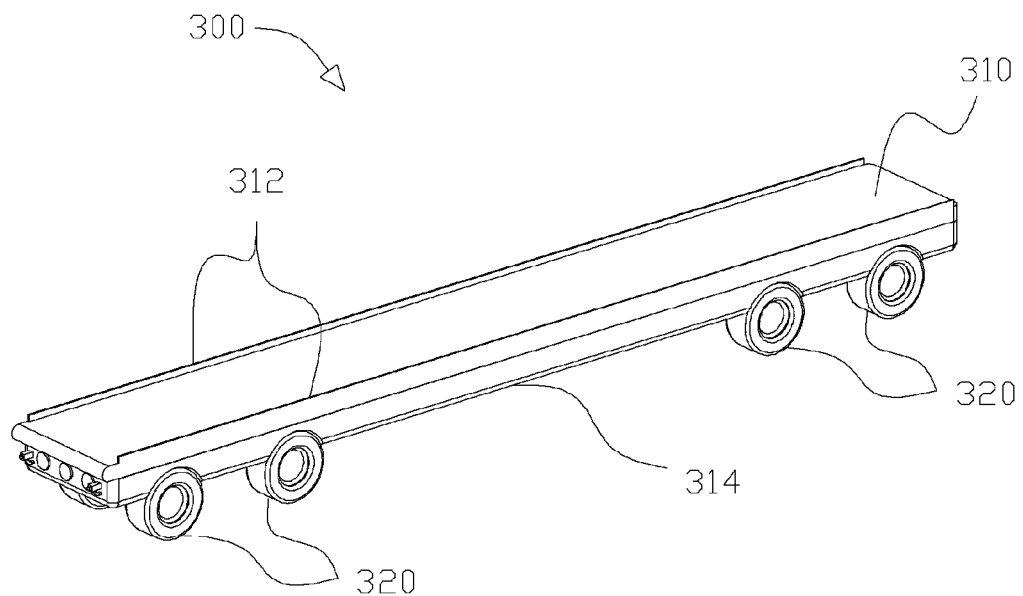
FIGS. 4A and 4B are perspective views of an embodiment of the movable platform used for loading the cargo assembly onto the aircraft.
Figure 4B:
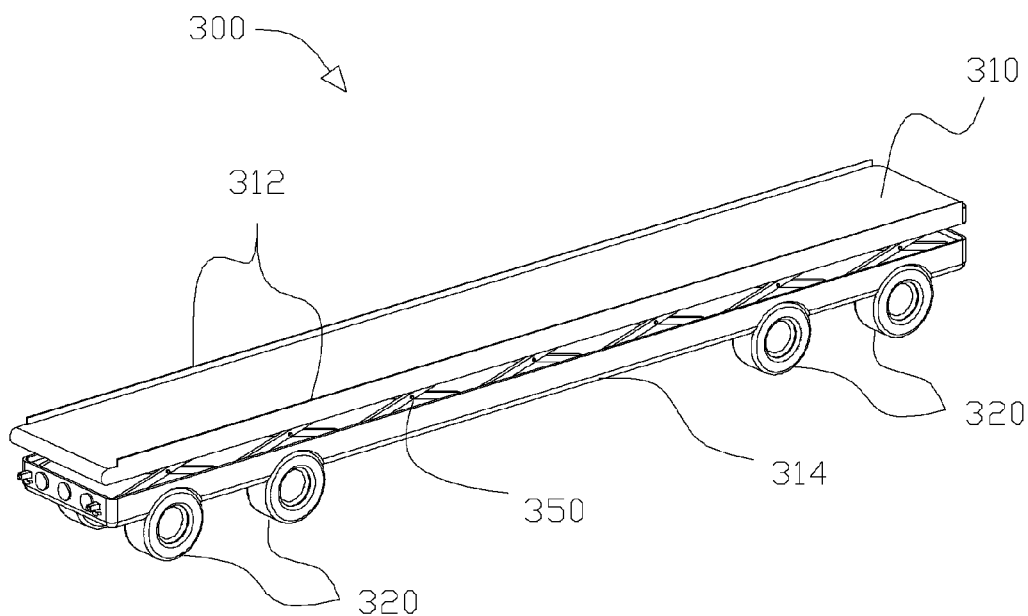

As shown in FIGS. 4A-B, the movable platform 300 comprises a surface 310 upon which the cargo assembly may be supported and a pair of longitudinal side flanges 312 to restrain the cargo assembly on the surface 310. The surface 310 is coupled to a lift mechanism 350 which, in turn, is coupled to a frame 314 supported by a plurality of wheels 320. The movable platform 300 is movable in both a horizontal and vertical direction, either manually or remotely. The movable platform 300 may further comprise a mechanism to facilitate the proper positioning of the cargo assembly 500 relative to the spine 120 prior to lifting the cargo assembly 500 onto the spine 120. This may be done via sensors which track the position of the cargo assembly 500 relative to the spine.

The absence of intervening aircraft structures when the fairing doors 164 are pivotally opened also permit the aircraft 100A to deliver the cargo assembly 500 loaded onto the upper spine 120 during flight. This may be accomplished by disengaging the cargo assembly 500 from the upper spine 120, and thereby allowing the cargo assembly 500 to drop to a desired location.

Figure 5A:
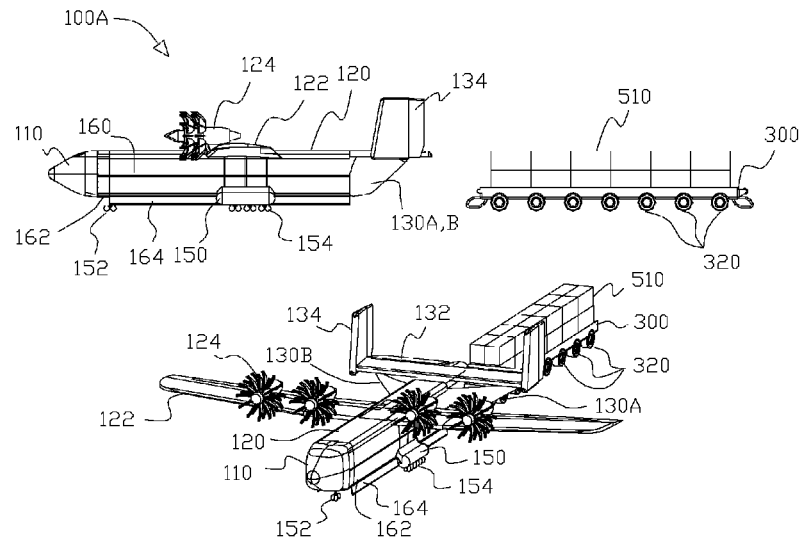
FIGS. 5A through 5C illustrate an exemplary sequence of loading, transporting and unloading of the cargo assembly from the aircraft.
Figure 5B:
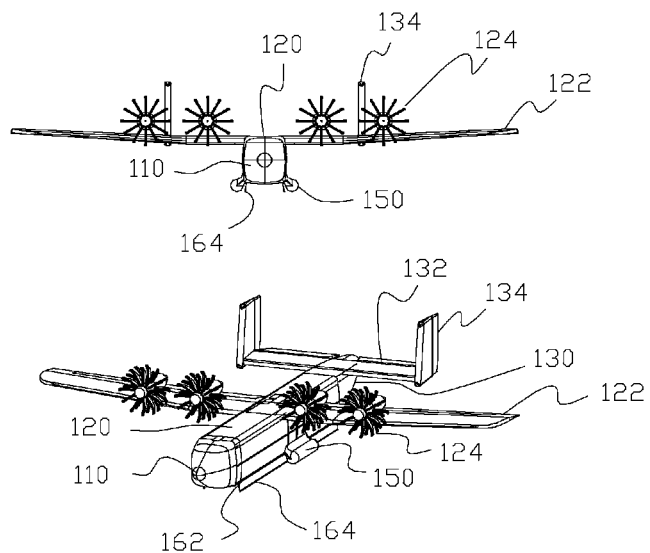
Figure 5C:
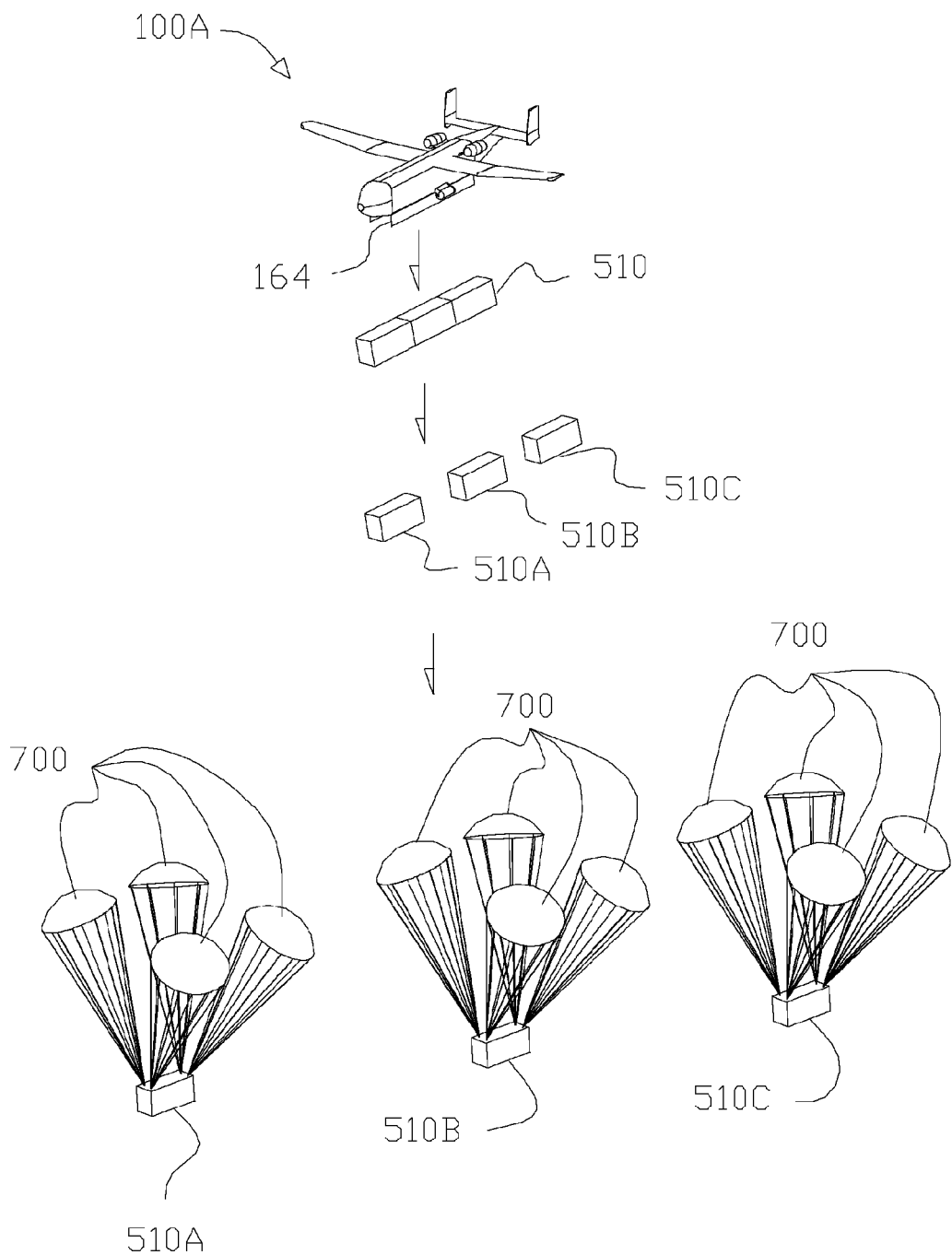

FIG. 5A-C illustrate an exemplary sequence of loading, transporting and unloading of the cargo assembly from the aircraft 100A. As shown in FIG. 5A, the aircraft 100A is supported on the ground by the forward landing gear 152 and the lateral landing gears 154 extended from the respective pods 150 on either sides of the spine 120. It is understood that the lateral landing gears 154 and the pods are angled away from the spine 120 so as to provide a clear passageway between the spine 120 and the ground for the movement of cargo. This is more clearly shown in FIGS. 3A-B, in which the arrangement of the supports 140 and the landing pods 150 and the lateral landing gear 154 permit the unobstructed passageway between the spine 120 and the ground.

FIG. 5A depicts the aircraft 100A in which the aft fairings 130A, 130B are pivotally opened to permit an aft access to the spine 120. A movable platform 300 comprising a plurality of wheels 320 is provided to transport the cargo assembly 510 through the aft access. Once the cargo assembly 510 is at an appropriate position underneath the spine 120, the movable platform 300 raises the cargo assembly 510 onto the spine 120 onto which it is attached via mounts. The aircraft 100A is ready for flight after the cargo assembly 510 is structurally integrated onto the spine 120 via the mounts and the aft fairings 130A, 130B are pivotally secured in the closed position.

FIG. 5B shows the aircraft 100A in flight with its forward landing gear 152 and the lateral landing gear 154 retracted. The lower fairing doors 164 are opened to permit the dropping of the cargo assembly 510 once the aircraft reaches a desired location for delivery. It is understood that the cargo assembly 510 is comprised of modular units of structural frame assemblies, structural container assemblies, or combinations thereof. The modular nature of the frames and containers allows great flexibility in creating a final cargo assembly that is capable of accommodating various types, sizes, dimensions and weights of cargo. Once these modular units are structurally coupled together to form a cargo assembly, they may be coupled to the aircraft spine to provide an integrated structure that is capable of taking on and distributing bending and tortional loads to the spine and the wings of the aircraft.

FIG. 5C illustrates an exemplary drop sequence in which the cargo assembly 510 is initially disengaged and dropped from the aircraft spine 120 as a single unit. In a preferred embodiment, the entire payload of the cargo assembly is disengaged at the same time so as to ensure that the weight distribution of the aircraft remains within an acceptable center of gravity. To that end, the mounts coupling the cargo assembly to the upper spine 120 may further comprise explosives which detonate at the same time to ensure complete and substantially simultaneous disengagement of the mounts.

Figure 6:
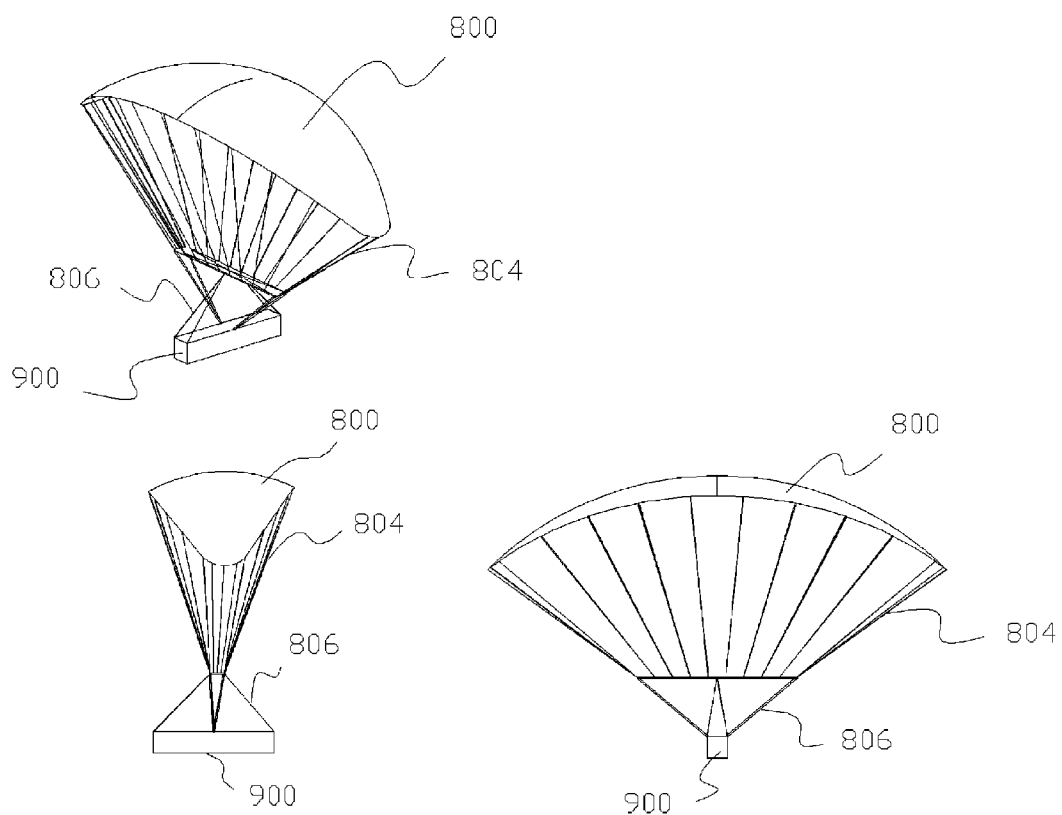
FIG. 6 is an embodiment of a cargo assembly having a deployed parachute.

The modular units 510A, B, C comprising the cargo assembly 510 may subsequently be disengaged from one another a pre-determined time after the cargo assembly 510 has been disengaged and dropped from the aircraft spine 120. In a preferred embodiment, the modular units 510A, B, C are disengaged from one another by a timed explosive which detonates to sever the mounts coupling the modular units 510A, B, C together. The modular units 510A, B, C are each further equipped with one or a plurality of parachutes 700 which deploy after the modular units 510A, B, C have been disengaged from one another. FIG. 6 depicts an alternative embodiment in which a single parabolic parachute 800 attached to a modular cargo unit 900 via lines 804 and risers 806.

While FIGS. 5A-C depict the delivery of the cargo assembly 510 while the aircraft 100A is in flight, it is understood that the cargo assembly 510 may also be delivered when the aircraft 100A is grounded. In accordance with this embodiment, once the aircraft 100A loaded with the cargo assembly 510 lands at the desired location, the aft fairing 130 and the lower fairing doors 164 may open and the mounts may disengage the cargo assembly 510. The cargo assembly 510 may drop to the ground and the aircraft 100A may proceed forward to clear the cargo assembly 510. The unloaded aircraft 100A may then be loaded with another cargo assembly or take-off to the next desired location.

In an yet another alternative embodiment, the cargo assembly may remain mounted onto the spine with only the contents of the cargo assembly being released. Such an embodiment is particularly useful in military applications, as shown in FIGS. 7 through 10.

Figure 7:
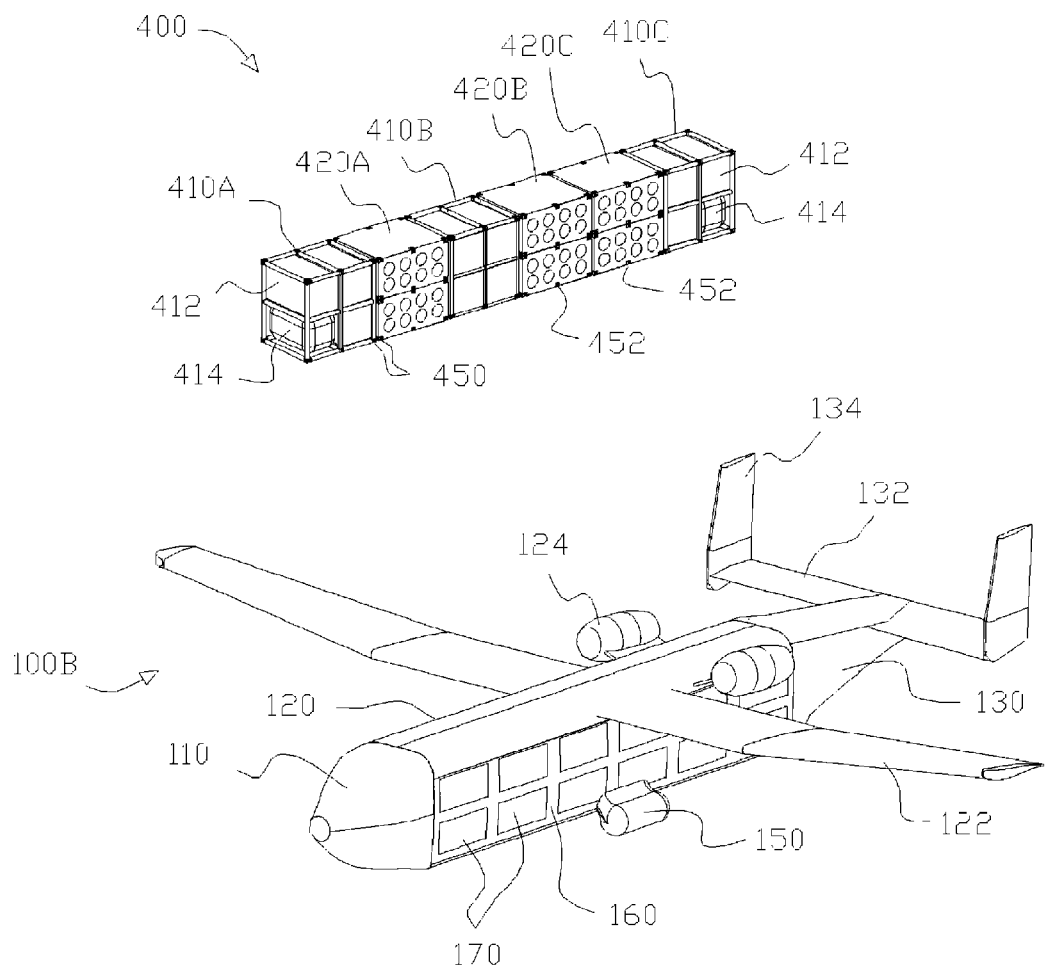
FIG. 7 is an embodiment of a cargo assembly and an aircraft having retractable side fairings to expose select portions of the cargo assembly.
Figure 9:
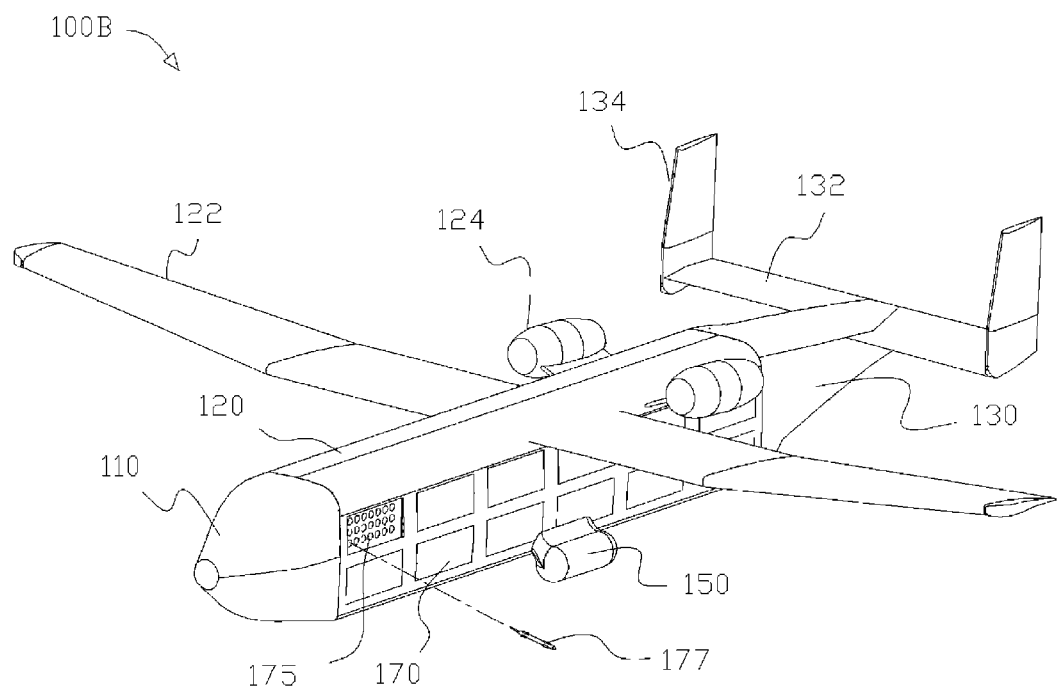
FIG. 9 illustrates the lateral deployment of a missile from an embodiment of the aircraft having retractable side fairings.

FIGS. 7 and 9 show an aircraft embodiment 100B in which the side fairing panels 160 further comprise a plurality of subpanels 170 which are retractable to expose a portion of the cargo assembly 400 mounted onto the spine 120. The cargo assembly 400 may be configured to house weapons and ammunition. To that end, the cargo assembly 400 may comprise a combination of modular frames 410A, B, C and modular weapon bays 420A, B, C coupled together by attachments 450. The structural frames 410A, B, C may be configured to house cargo 412 and fuel 414, while the modular weapon bays 420A, B, C may house various types of weapons, ammunition or artillery. As shown in FIG. 9, subpanel 175 is retracted while the aircraft 100B is in flight to allow firing of ammunition 177 from a weapon that is housed in an exposed modular weapon bay.

Figure 8A:
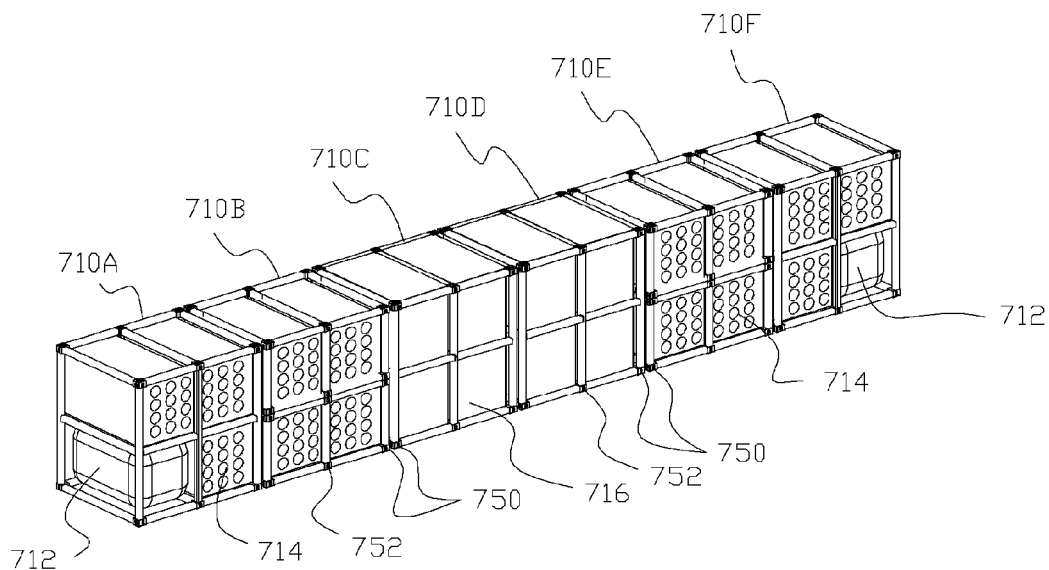
FIGS. 8A and 8B are top and bottom perspective views, respectively, of an embodiment of a cargo assembly.
Figure 8B:
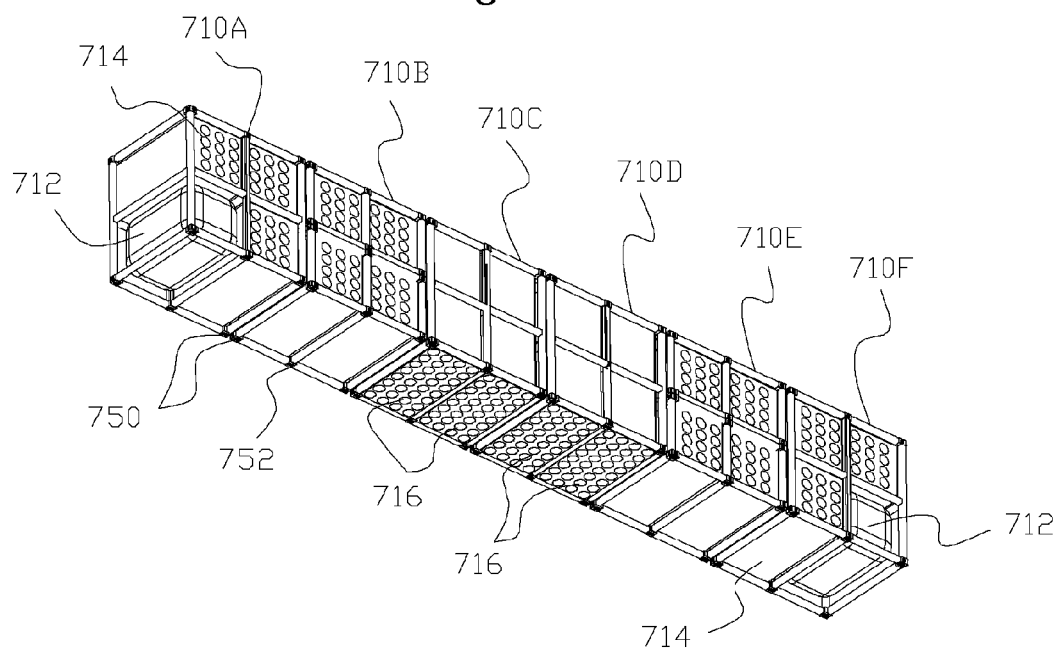

FIG. 8A-B depict another embodiment of a cargo assembly comprising a plurality of modular weapon bays 714, 716 housed within a plurality of structural frames 710A-F coupled together by attachments 750. Modular weapon bay 714 is laterally oriented such that ammunition may be fired when the corresponding subpanel 170 is retracted. Similarly, modular weapon bay 716 is oriented downward towards the ground such that, when mounted onto the aircraft spine, ammunition is fired or dropped therefrom. One or more bladders 712 comprising fuel or other liquids may optionally be stored.

Figure 10:
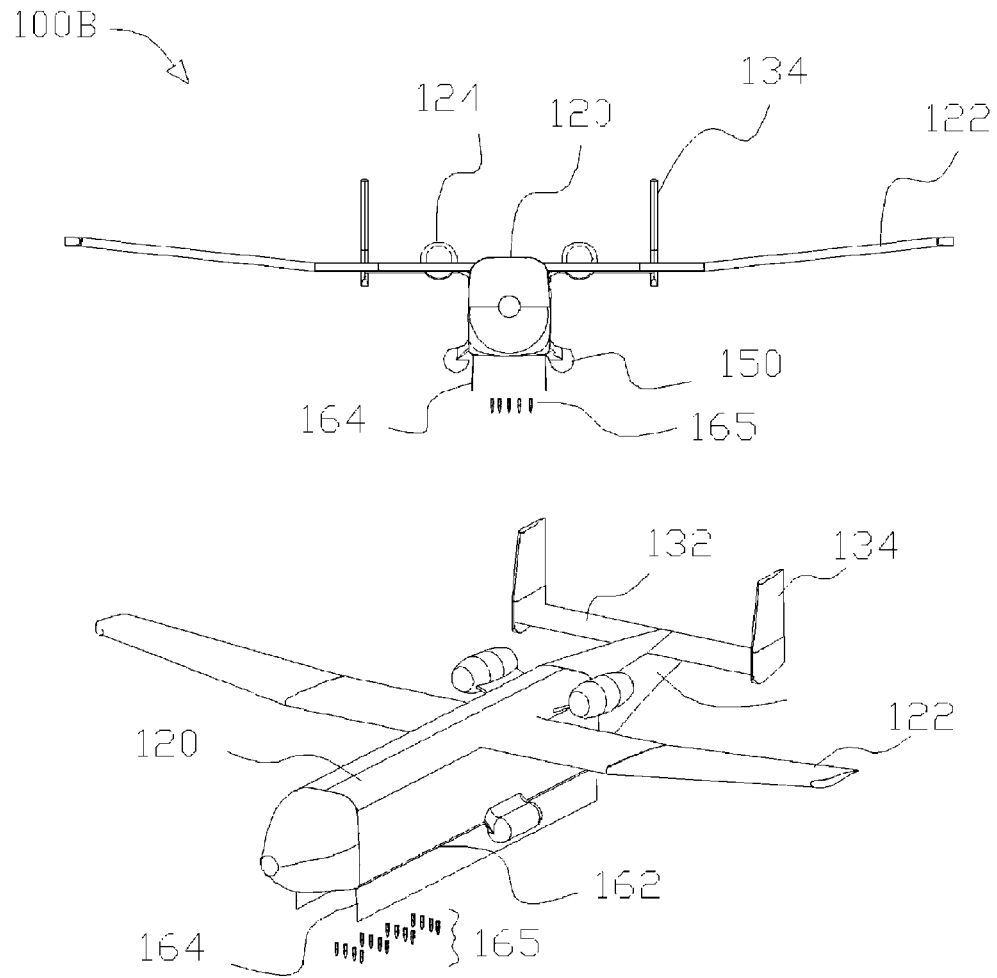
FIG. 10 illustrates the drop deployment of missiles or bombs from an embodiment of the aircraft having open lower fairing doors.

FIG. 10 shows an embodiment in which the bombs or ammunition 165 are dropped or fired through the opened lower fairing doors 164. Again, in such an embodiment, the cargo assembly may be used to house artillery from which ammunition 165 may be launched through the open lower fairing doors 165 while the aircraft 100B is in flight.

It is to be understood that the detailed description and specific examples, while indicating preferred embodiments of the present invention, are given by way of illustration and not limitation. Many changes and modifications within the scope of the present invention may be made without departing from the spirit thereof, and the invention includes all such modifications.

What is claimed is:

1. An aircraft for transporting a cargo assembly comprising:
   a forward fairing;
   an aft fairing movable between a fixed position for flight and an open position for at least loading and unloading of the cargo assembly;
   a spine disposed between the forward fairing and the aft fairing, the spine defining an upper external surface of the aircraft and a lower coupling surface; and
   a plurality of mounts attached to the lower coupling surface of the spine to structurally engage and suspend the cargo assembly from the spine;
   wherein the aircraft is configured such that an unobstructed passageway is provided between the ground surface and the spine during loading or unloading of the cargo assembly onto or from the spine, respectively; and
   wherein an aft access to the unobstructed passageway and the spine is provided when the aft fairing is moved to the open position.

2. The aircraft of claim 1, wherein in the open position, the aft fairing is removed from the aircraft to provide the aft access to the unobstructed passageway and the spine.

3. The aircraft of claim 1, wherein in the open position, the aft fairing is pivotally moved to provide the aft access to the unobstructed passageway and the spine.

4. The aircraft of claim 1, further comprising lower fairing doors pivotally coupled to lateral sub-structures coupled to the forward fairing and the aft fairing.

5. The aircraft of claim 1, further comprising side fairing panels disposed between the forward fairing and the aft fairing.

6. The aircraft of claim 5, wherein the side fairing panels further comprise one or more subpanels, the one or more subpanels being retractable to expose a portion of the cargo assembly.

7. The aircraft of claim 6, wherein the subpanels are retracted to expose the portion of the cargo assembly while the aircraft is in flight.

8. The aircraft of claim 1, wherein the plurality of mounts are actuated between an engage and a release position, wherein in the engage position, the mounts structurally engage the cargo assembly to the spine and wherein in the release position, the mounts disengage and release the cargo assembly from the spine.

9. The aircraft of claim 8, wherein the plurality of mounts are actuated in a release position to disengage and release the cargo assembly from the spine while the aircraft is in flight.

10. The aircraft of claim 1, wherein the aft fairing comprises two halves pivotally coupled to corresponding sides of the aircraft.

11. The aircraft of claim 10, wherein the two halves of the aft fairing are pivotally actuated in the open position to increase drag during landing of the aircraft.

12. The aircraft of claim 1, further comprising wings coupled to the spine.

13. The aircraft of claim 12, further comprising landing gear and supports coupling the landing gear to either one or both of the spine or the wings.

14. An aircraft comprising:
a forward fairing;
an aft fairing;
a spine disposed between the forward fairing and the aft fairing, the spine defining an upper external surface of the aircraft and a lower coupling surface;
a cargo container comprising a plurality of laterally-oriented modular bays;
a plurality of mounts to structurally engage the cargo assembly to the lower coupling surface of the spine;
side fairing panels disposed on opposing sides of the cargo container, the side fairing panels comprising a plurality of retractable subpanels corresponding to the plurality of laterally-oriented modular bays, the subpanels retracting to expose the contents of the laterally-oriented modular bays.

15. The aircraft of claim 14, wherein at least one of the laterally-oriented modular bays comprises a weapon and wherein the weapon is positioned to fire ammunition from the bay when the corresponding subpanel is retracted to expose the bay.

16. An aircraft comprising:
a forward fairing;
an aft fairing;
a spine disposed between the forward fairing and the aft fairing, the spine defining an upper external surface of the aircraft and a lower coupling surface;
a cargo container comprising a plurality of laterally-oriented modular bays;
a plurality of mounts to structurally engage the cargo assembly to the lower coupling surface of the spine; and
lower fairing doors which may be pivotally opened and closed.

17. The aircraft of claim 16, wherein the lower fairing doors enclose a bay comprising weapons or ammunition when the lower fairing doors are closed and wherein the lower fairing doors permit the weapons or ammunition to be dropped from the aircraft when the lower fairing doors are opened.

18. The aircraft of claim 16, wherein the lower fairing doors extend along the entire length of the cargo container.

* * * * *